June 4, 1929.  C. BÜCHER  1,716,205
METHOD OF RENDERING IRON PIPES IMMUNE FROM THE ATTACK BY
WATER AND APPARATUS FOR PERFORMANCE OF THIS METHOD
Filed Feb. 3, 1927   2 Sheets-Sheet 1
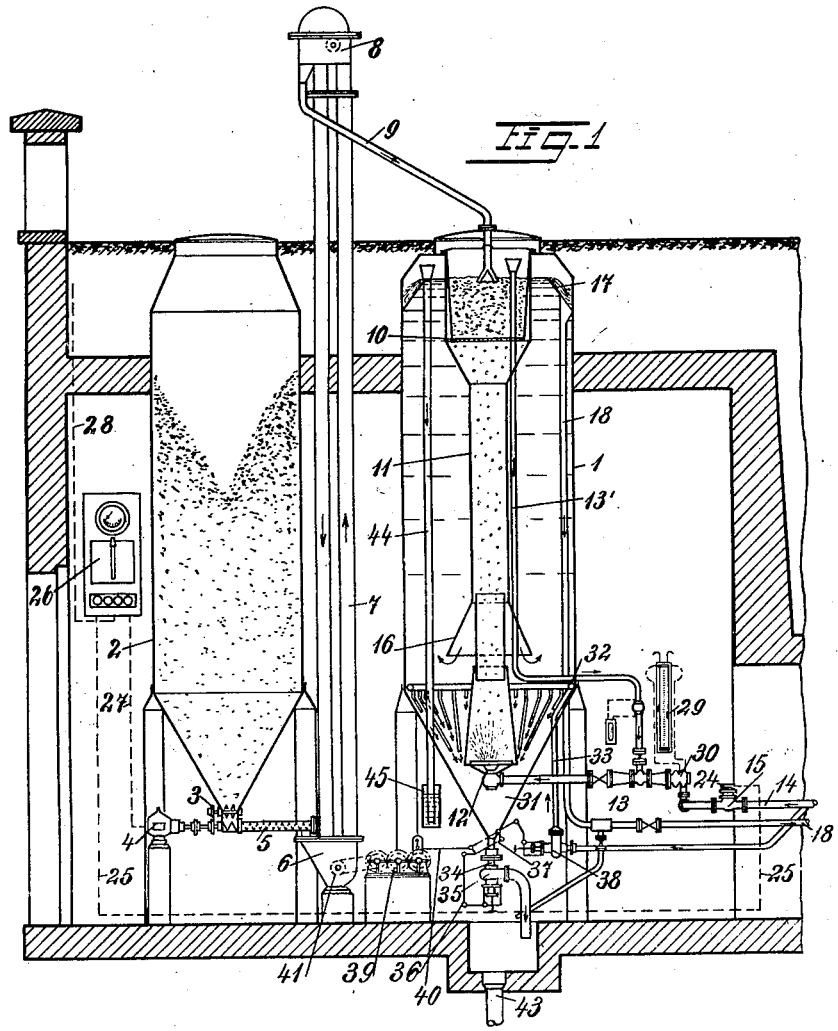
INVENTOR
Christian Bücher
by Langner, Parry, Card & Langner
Att'ys

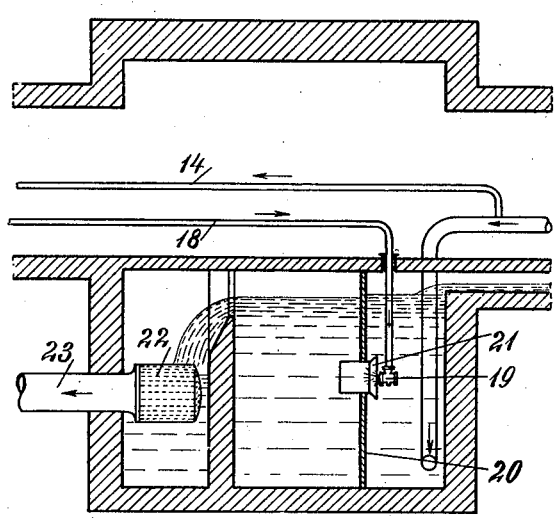

Patented June 4, 1929.

1,716,205

UNITED STATES PATENT OFFICE.

CHRISTIAN BÜCHER, OF WIESBADEN, GERMANY.

METHOD OF RENDERING IRON PIPES IMMUNE FROM THE ATTACK BY WATER AND APPARATUS FOR PERFORMANCE OF THIS METHOD.

Application filed February 3, 1927, Serial No. 165,707, and in Germany February 12, 1926.

It has been hitherto proposed to protect iron water pipes by linings of asphalt, zinc, etc., against attack by the water. Such protective linings are not however, sufficiently resistant and cannot prevent the decomposition of the pipes and the formation of incrustation from the decomposition products.

It has now been ascertained that the formation of iron incrustations is due principally to the electrolytic forces set up in the water pipes. These electrolytic forces increase with increasing decomposition of the metallic iron, and to a considerable extent, with the age of the water pipes, so that, eventually, in old pipes, even in contact with neutral water, considerable amounts of iron are dissolved and incrustations formed.

It has been further ascertained that, next to the free carbonic acid present in the water, oxygen sometimes present plays a great part in the decomposition of the pipes, indeed the latter, even in the absence of free carbonic acid, dissolves considerable quantities of iron and without noticeable local movement changes to insoluble oxides and thence finally oxidizes and separates out iron compounds of carbonic acid. From investigations on the electrolytic nature of the reaction thus occurring it appears that the decomposition of the iron by oxygenated water is dependent upon the particular hydrogen concentration (pH-value), in such a way, that, with increasing pH-value, the process of dissolution of the iron is less vigorous, and, with decreasing pH-value, is more vigorous.

The invention avoids these disadvantages by the addition to the pipe water of practically pure calcium hydrate solution in predetermined proportion, preferably in such amount that, after combining without residue with the free monocarbonate ($CaCO_3$) which may be present, it remains in the mixture to the extent of, for example, 20 milligrammes per litre. Simultaneously the hydrogen ion concentration is preferably raised in the mixture above the neutrality point, for example, to $pH = 8.5$, the value being however kept suitably under the limit prescribed by taste. Under these circumstances the monocarbonates can remain in solution for weeks, while, at the same time, as a result of the raising of the hydrogen ion concentration, attack by the oxygen which may be present is prevented.

The water so treated separates out, in its passage through the water pipes and under the action of the electrolytic forces set up, monocarbonates from solution on to the unprotected walls of the pipes in contact with the water until a saturation of the iron with lime is achieved. This occurs only after a long time and has as a result the complete cessation of the precipitation of lime. By this process there is formed a lining, consisting of iron and lime, covering the inside of the water pipes, after the formation of which further decomposition of the iron and the formation of incrustation ceases.

For the carrying out of this process, there may be used the apparatus forming the subject matter of this invention and which serves for the automatic production of a continuously uniformly constituted lime water, i. e. a water of pre-determined concentration. In carrying out the process it is to be understood that, for example, the proportion of calcium hydrate solution to be added to the water in the pipes can be varied so that the addition of calcium hydrate is suitably regulated according to the particular chemical properties of the water and the time it is in the water pipe. In the carrying into practice of the process, first of all the calcium hydrate solution of a given concentration is separately prepared and the solution so prepared added continuously or intermittently in the desired proportion to the water in the pipes.

In the drawings the new apparatus for the carrying out of the process is shown in one of its embodiments by way of example.

Fig. 1 shows, in section, the apparatus serving for the preparation of the calcium hydrate solution, Fig. 2 shows an installation in which the calcium hydrate solution already prepared is added in desired proportion to the water in the pipes.

In Fig. 1 there is shown a container 1 in which the preparation of the calcium hydrate solution is carried out in the following manner. From the hopper or silo 2 containing the calcium hydrate powder, calcium hydrate powder, after thorough loosening and breaking up, for example, by means of an agitating mechanism 3 working at the lower end of the silo, is fed by mechanical feed means, for example, by a worm 5 driven from the motor 4 to the lower elevator receptacle 6. Hence it passes through the elevator tube 7 to the upper elevator receptacle 8 and from the latter through the channel 9 into a suitable vessel 10, rendered air tight and having a perforated bottom and perforated walls and, for example, of bucket shape. The vessel 10 is located in a hollow body 11 placed in the container 1.

By means of the injector 13 incorporated in the conduit 14 containing fresh water under pressure and led off from the main pipe line before addition of calcium hydrate solution the air passing out into the upper part of the vessel 10 is drawn down the pipe 13' and is again circulated by the tuyère 12 in the lower end of the hollow body 11. By the continuously circulating air stream the lime powder passed into the vessel 10 is maintained in a state of suspension. By means of the conduit for water under pressure being connected to the injector 13, at the same time the fresh water is passed in with the air current through the tuyère 12, an intimate mixture with the lime powder passing from the vessel 10 through the hollow body 11 is effected. Thereupon any calcium carbonate present or formed separates out, and the water is saturated with calcium hydrate. The prepared calcium hydrate solution passes out at the lower widened, funnel shaped end 16 of the hollow body 11 so as to be passed at an overflow 17 into the pipe 18 to the place where it is to be used.

The lime water prepared is added to the untreated water, for example, in a plant such as that shown in Fig. 2. This admixture is effected in a container of comparatively large dimensions, for example, of concrete which is divided by a partition 20 into two compartments. The untreated water flows into the first then through a channel 12 formed as a hopper or as a Venturi pipe into the second compartment. In the first compartment the prepared lime hydrate solution is introduced through a pipe 18 from which it flows by way of a mixing nozzle in a state of fine division into the channel 21. Here the lime hydrate solution becomes intimately mixed with the untreated water passing through as a result of which the latter is neutralized. From the second compartment neutralized water is led, for example, by means of an overflow into a third compartment from which after passing through a filter 22 it passes into the water pipe 23.

The supply of the lime hydrate from the silo 2 to the mixer 1 may be continuous or intermittent. The quantity supplied is preferably so controlled that a solution of quite definite concentration or a saturated lime hydrate solution of such quantity flows out that on mixture of the solution with the untreated water, the latter takes up a quite definite constant quantity of lime hydrate. In order to control the formation of the lime hydrate solution and its addition to the untreated water in dependence on the quantity of untreated water an electric switch device of the kind illustrated diagrammatically in Fig. 1 may be used. In this arrangement an electric switch 24 is connected with the water meter 15 which switch is connected by the conductor 25 with the independent time switch 26 to which the motor 4 is connected by the conductor 27. The supply of current may be effected by a conductor 28 from the mains.

This switch mechanism acts in such manner that when a definite quantity of untreated water, for example, five cubic metres has passed through the water meter 15, the electrical switch apparatus 24 is actuated and the time switch 26 is set in operation. The driving motor 4 is thus set in operation for a definite time so that a definite quantity of lime hydrate powder is fed through the conveyor to the mixing chamber 1 and the quantity of water supplied to the mixing chamber leaves as a lime hydrate solution of quite definite concentration.

If with the described arrangement an indicator 29 is connected to the pipe 14 at a suitable point beyond the water meter which operates, for example, with a Venturi pipe provided at 30, there can be ascertained by the indicator 29 the desired concentration and by simple regulation of the quantity of untreated water by watching the indicator, the concentration of the solution leaving the container 1 can be adjusted to the desired degree.

A further feature of the apparatus shown in Fig. 1 consists in the provision of special means for removing any sediment separating out. For this purpose, for example the container 1 may be of conical form at its lower end 31 and may be provided with a mud ejecting device 32 which, for example, is connected to a flushing water pipe 33 branched from the pipe 14.

Preferably the mud is flushed out or sprayed out through the lower opening 34 of the collecting chamber 31 at intervals under automatic control. Automatic flushing can be controlled preferably, for example, by the same devices which actuate the means supplying lime hydrate to the container 1. For this purpose a valve 35 may be provided in the opening 34 which is connected by levers 36 and a parallelogram 37 with the automatic closing valve 38. The parallelogram 37 is preferably driven through the medium of suitable transmission members 39, 40, from the members effecting the feed of the lime hydrate powder, for example, from the elevator pulley 41. The mud blown out of the pipe 42 can be removed by a blow-off pipe 43. An overflow pipe 44 with a water seal 45 may be arranged on the container 1.

The device described is only one example and may be varied in many ways without departure from the scope of the invention. Thus, for example, the dimensions and arrangement of the mixer and of the supply hopper, the manner of supplying the lime hydrate powder, the mixing of the same with the water as also the positive control of the concentration and the quantity of solution produced, as also the discharge of the mud and finally the mixture of the prepared solution with the untreated water may all be carried out in different ways.

Instead of or in addition to lime hydrate also other alkaline materials may be used which do not unfavourably affect the hygienic properties of the water such as caustic lime, caustic soda, and soda under the present method.

I claim:—

1. Apparatus, for the carrying out of a process for the protection of pipe lines from attack by water, comprising an upright container, a hollow body upright within said container and open at its ends to the container, a perforated vessel at the top of said hollow body, mechanism for automatically feeding calcium hydrate powder into said perforated vessel, a pipe conveying fresh water under pressure to the lower end of the hollow body, and an injector incorporated in said pipe and adapted to draw air from the air space at the top of the container and blow it into the hollow body again with the fresh water to assist in dissolving calcium hydrate in the water to form a solution for addition to the water in the pipe line.

2. Apparatus, for the carrying out of a process for the protection of pipe lines from attack by water, comprising a silo for powdered calcium hydrate, an upright container, a hollow body upright within said container and open at its ends to the container, a perforated vessel at the top of said hollow body, a power driven worm and elevator to feed calcium hydrate from the silo to the perforated vessel, a pipe conveying fresh water under pressure to the lower end of the hollow body, an injector incorporated in said pipe and adapted to draw air from the air space at the top of the container and blow it into the hollow body again with the fresh water to assist in dissolving calcium hydrate in the water, and means for adding the solution thus formed to the water in the pipe line in desired proportion.

3. Apparatus, for the carrying out of a process for the protection of pipe lines from attack by water, comprising an upright container, a hollow body upright within said container and open at its ends to the container, a perforated vessel at the top of said hollow body, mechanism for automatically feeding calcium hydrate powder into said perforated vessel, a branch pipe conveying fresh water under pressure from the pipe line to be protected to the lower end of the hollow body, and an injector incorporated in said pipe and adapted to draw air from the air space at the top of the container and blow it into the hollow body again with the fresh water to assist in dissolving calcium hydrate in the water to form a solution for addition to the water in the pipe line.

4. Apparatus, for the carrying out of a process for the protection of pipe lines from attack by water, comprising a silo for powdered calcium hydrate, an upright container, a hollow body upright within said container and open at its ends to the container, a perforated vessel at the top of said hollow body, a power driven worm and elevator to feed calcium hydrate from the silo to the perforated vessel, a branch pipe conveying fresh water under pressure from the pipe line to be protected to the lower end of the hollow body, an injector incorporated in said pipe and adapted to draw air from the air space at the top of the container and blow it into the hollow body again with the fresh water to assist in dissolving calcium hydrate in the water and means for adding the solution thus formed to the water in the pipe line in desired proportion.

5. Apparatus for the carrying out of a process for the protection of pipe lines from attack by water comprising a container, means for feeding calcium hydrate into said container, means for supplying water to said container to dissolve the calcium hydrate, a chamber divided by a partition into two compartments into the first of which the untreated water flows, a nozzle in said first compartment wherethrough calcium hydrate solution is introduced, a Venturi passage in the partition into the second compartment, a weir serving as an outlet from the second compartment and a filter through which the treated water again passes into the pipe line.

In testimony whereof I have signed my name to this specification.

CHRISTIAN BÜCHER.